United States Patent
Bold

(10) Patent No.: US 11,052,571 B2
(45) Date of Patent: Jul. 6, 2021

(54) CONTINUOUS FABRICATION FOR COMPOSITE PREFORMS

(71) Applicant: The Boeing Company, Chicago, IL (US)

(72) Inventor: Jens Bold, Munich (DE)

(73) Assignee: The Boeing Company, Chicago, IL (US)

( * ) Notice: Subject to any disclaimer, the term of this patent is extended or adjusted under 35 U.S.C. 154(b) by 154 days.

(21) Appl. No.: 16/045,982

(22) Filed: Jul. 26, 2018

(65) Prior Publication Data

US 2020/0031019 A1    Jan. 30, 2020

(51) Int. Cl.
| | |
|---|---|
| *B29B 11/12* | (2006.01) |
| *B29B 11/16* | (2006.01) |
| *B32B 37/22* | (2006.01) |
| *B29C 70/38* | (2006.01) |
| *B29K 307/04* | (2006.01) |

(52) U.S. Cl.
CPC .............. *B29B 11/12* (2013.01); *B29B 11/16* (2013.01); *B29C 70/386* (2013.01); *B32B 37/22* (2013.01); *B29C 2793/0009* (2013.01); *B29C 2793/009* (2013.01); *B29K 2307/04* (2013.01)

(58) Field of Classification Search
CPC ..... B29B 11/12; B29C 70/202; B29C 70/386; B29C 70/504; B29C 2793/009; B29C 70/38; B29C 70/50; B29C 70/545; B29L 2031/3076; B65H 2701/174; B26F 1/40; B32B 37/22

See application file for complete search history.

(56) References Cited

U.S. PATENT DOCUMENTS

| | | | |
|---|---|---|---|
| 3,556,888 A | 1/1971 | Goldsworthy | |
| 4,938,824 A * | 7/1990 | Youngkeit | B29C 70/382 156/173 |
| 5,824,178 A * | 10/1998 | Shingu | B29C 70/202 156/265 |
| 6,607,626 B2 * | 8/2003 | Taggart | B29C 70/228 156/177 |
| 2003/0054930 A1 * | 3/2003 | Conger | B26D 7/1863 493/373 |
| 2011/0297306 A1 * | 12/2011 | Yang | B29C 45/14221 156/242 |
| 2015/0344347 A1 * | 12/2015 | Fleming | C03B 17/068 65/29.18 |
| 2018/0071962 A1 * | 3/2018 | Klimovski | B29D 99/0003 |

FOREIGN PATENT DOCUMENTS

DE    102012111761 A1    6/2014

OTHER PUBLICATIONS

COPRO Technology; https://www.copro-technology.com; Jun. 21, 2018.
European Search Report; Application EP19172794; dated Nov. 8, 2019.

* cited by examiner

*Primary Examiner* — Philip C Tucker
*Assistant Examiner* — Jimmy R Smith, Jr.
(74) *Attorney, Agent, or Firm* — Duft & Bornsen, PC

(57) ABSTRACT

Systems and methods are provided for fabricating preforms for composite parts. One embodiment is a method of creating a preform. The method includes conveying a web of fiber reinforced composite material in a process direction, disposing fiber reinforced composite material atop the web, conveying the web and the tow in the process direction to a cutting tool, and cutting out a preform comprising a combination of the tow and the web.

20 Claims, 8 Drawing Sheets

CONTINUOUS FABRICATION FOR COMPOSITE PREFORMS

FIELD

The disclosure relates to the field of composite parts, and in particular, to laying up preforms for composite parts.

BACKGROUND

Laying up a preform that will be hardened into a composite part remains a labor intensive process. To create the preform, plies of fiber reinforced material are iteratively applied over a layup tool, such as a mandrel. When a preform is in the shape of a complex contour, a robot such as an Automated Fiber Placement (AFP) machine may be used to facilitate the layup process. Layup continues until the preform achieves a desired shape. The preform may then be transferred to a forming tool and shaped before it is hardened into a composite part. Before a preform is fabricated, individual plies that will form part of the preform may be cut and stored. These cut plies are then transported to the layup tool and added to the preform (e.g., as layup continues). Ply storage may occupy a large amount of space in the fabrication environment, and may even utilize specialized temperature or humidity controlled storage chambers. Furthermore, transfer of a preform from a layup tool to a forming tool may distort portions of the preform, which is undesirable.

Therefore, it would be desirable to have a method and apparatus that take into account at least some of the issues discussed above, as well as other possible issues.

SUMMARY

Embodiments described herein provide continuous fabrication techniques for generating preforms that do not necessitate storage of pre-cut plies, nor transfer of a preform from a layup tool to a forming tool. These continuous techniques may also eliminate the need for expensive equipment such as AFP machines, and may accelerate the process by which preforms are fabricated.

One embodiment is a method of creating a preform. The method includes conveying a web of fiber reinforced composite material in a process direction, disposing fiber reinforced composite material atop the web, conveying the web and the tow in the process direction to a cutting tool, and cutting out a preform comprising a combination of the tow and the web.

A further embodiment is a non-transitory computer readable medium embodying programmed instructions which, when executed by a processor, are operable for performing a method for creating a preform. The method includes conveying a web of fiber reinforced composite material in a process direction, disposing fiber reinforced composite material atop the web, conveying the web and the tow in the process direction to a cutting tool, and cutting out a preform comprising a combination of the tow and the web.

Another embodiment is an apparatus for creating a preform. The apparatus includes a web advancement mechanism that conveys a web of fiber reinforced composite material in a process direction, at least one deposition station that disposes fiber reinforced composite material atop the web; and a cutting tool disposed downstream of the deposition station that cuts out a preform comprising a combination of the tow and the web.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together form a preform. Individual fibers within each layer of the preform are aligned parallel with each other, but different layers may exhibit different fiber orientations in order to increase the stiffness and/or the strength of the resulting composite along different dimensions. The preform may include a resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may return to liquid form if it is re-heated.

Figure 1:
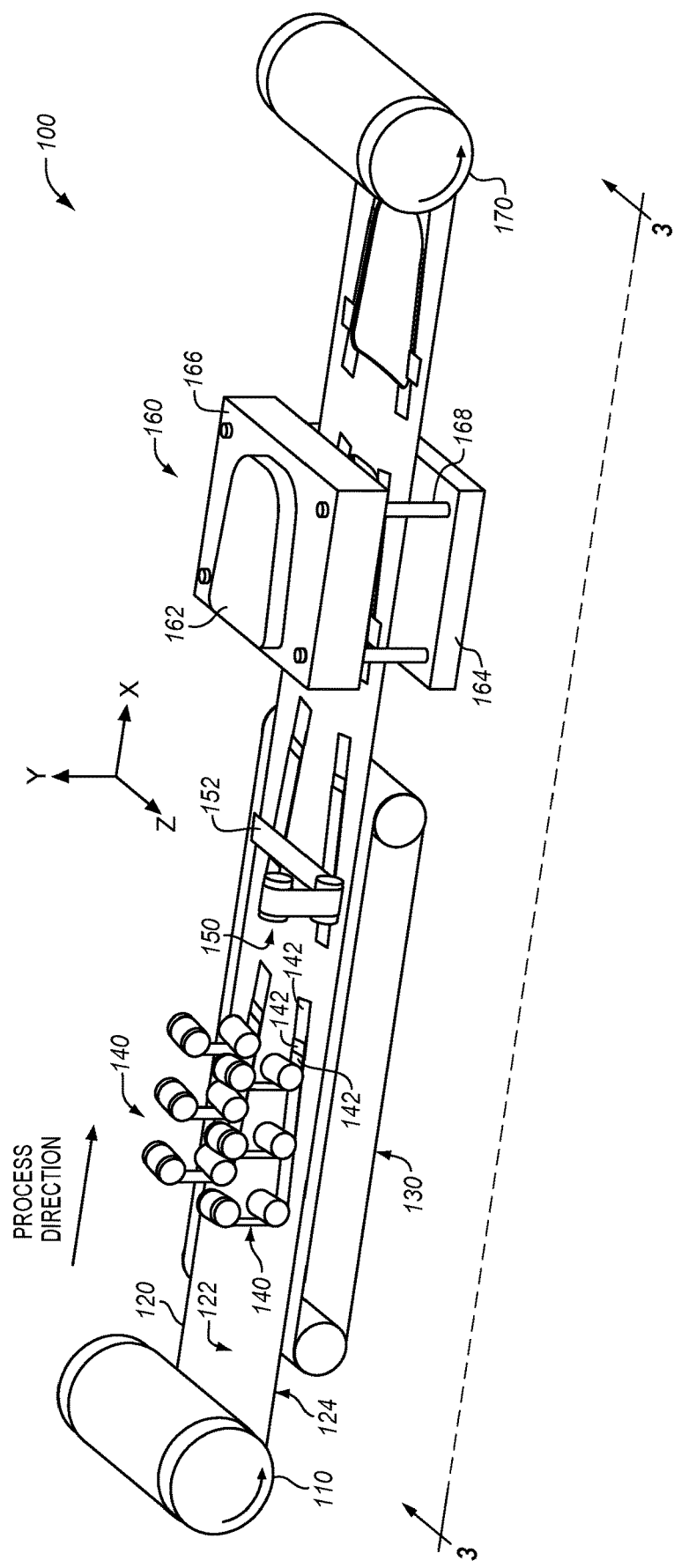
FIG. 1 is a perspective view of a preform fabrication system in an illustrative embodiment.

FIG. 1 is a perspective view of a preform fabrication system 100 in an illustrative embodiment. Preform fabrication system 100 comprises any system, device, or component operable to lay up tows of fiber reinforced material onto a web of fiber reinforced material, and to cut the tows and web into a preform for hardening into a composite part. In this embodiment, preform fabrication system 100 includes dispensing spool 110, which may be mechanically driven to dispense web 120 of fiber reinforced material (e.g., CFRP, such as unidirectional CFRP having a fiber orientation of 0°+45°, −45°, 90°, or even a web of woven material or non-woven material) continuously in a process direction at several to many feet per second. The fiber reinforced material may comprise any suitable material, including dry fiber, pre-preg, etc.

One or more ply deposition stations may dispose tows onto surface 122 of web 120. For example, angled deposition stations 140 may dispense tows 142 that are angled (e.g., +α°, −α°) with respect to the process direction, while perpendicular deposition station 150 may dispense tows 152 that are perpendicular to the process direction. The ply deposition stations may operate even while web 120 is traveling in the process direction in order to enhance fabrication speed, and may dispense tows 142 at a rate slower than, equal to, or faster than the speed of web 120.

Conveyor 130 may contact surface 124 of web 120, and prevents web 120 from deflecting downward (i.e., in the negative Y direction) when tows are applied to web 120. Stated more directly, conveyor 130 provides a reaction to any compaction force applied during tow deposition. This enables tows to be adhered to web 120 via the application of pressure against web 120. In such instances, both tows and web 120 may include a tackifier or binder that facilitates adherence of the tows to the web 120.

After a desired amount of plies have been disposed at web 120, web 120 is conveyed to forming station 160. Forming station 160 includes stamp 162 and mandrel 164. When stamp 162 is driven into mandrel 164, stamp 162 applies forces which form the web 120 into a predetermined shape. While web 120 is shaped in this manner, cutting tool 166 (e.g., a tool having a circumferential blade 167 of FIG. 3 that cuts an entire preform from web 120 at once, or a traveling blade that cuts a portion of web 120 at a time) cuts out the shaped portion of the web, resulting in a preform. The preform may then be removed from stamp 162 or mandrel 164, and a new section of web 120 may be conveyed into forming station 160. Unused portions of web 120 may be acquired by take-up spool 170, which may also be mechanically driven (e.g., by an internal actuator) in order to provide take up portions of web 120. The driving of dispensing spool 110 and take-up spool 170 may be coordinated to apply tension to web 120 during the creation of preforms and/or the application of tows to web 120.

By fabricating preforms as part of a continuous process, preform fabrication system 100 avoids numerous issues that were encountered by prior systems. For example, preform fabrication system 100 does not require storage of pre-cut plies, does not require the use of expensive AFP machines, and also does not require layup processes to be separated from cutting processes. Still further, preform fabrication system 100 does not require complex and expensive lay-up mandrels (e.g., with or without contours), and does not require lay-up controls to compensate for laying up upon a mandrel (e.g., especially contoured and/or complex contoured mandrels). These advantages enable preforms to be created in a manner that is both faster and less expensive than prior systems could achieve.

Illustrative details of the operation of preform fabrication system 100 will be discussed with regard to FIG. 2. Assume, for this embodiment, that dispensing spool 110 is loaded with web 120, and that a technician wishes to initiate fabrication of preforms at web 120. The technician draws web 120 to the take-up spool 170, and proceeds to direct dispensing spool 110 and take-up spool 170 to start spinning.

Figure 2:
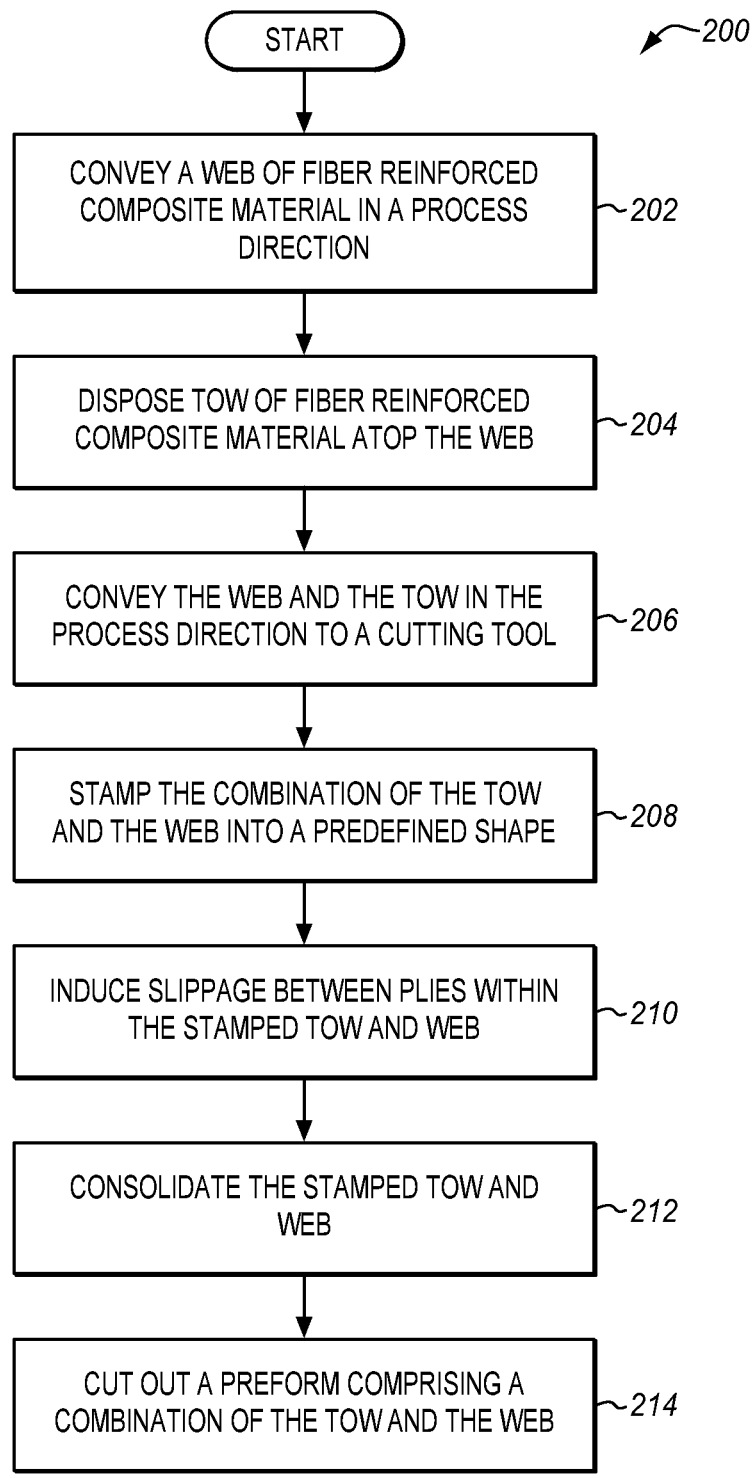
FIG. 2 is a flowchart illustrating a method for operating a preform fabrication system in an illustrative embodiment.

FIG. 2 is a flowchart illustrating a method 200 for operating a preform fabrication system in an illustrative embodiment. The steps of method 200 are described with reference to preform fabrication system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, dispensing spool 110 and take-up spool 170 convey the web 120 in the process direction. This may be performed at a constant velocity in order to advance a portion of web 120 towards the angled deposition stations 140. As web 120 is conveyed, dispensing spool 110 continues to provide new portions of the web 120.

Figure 3:
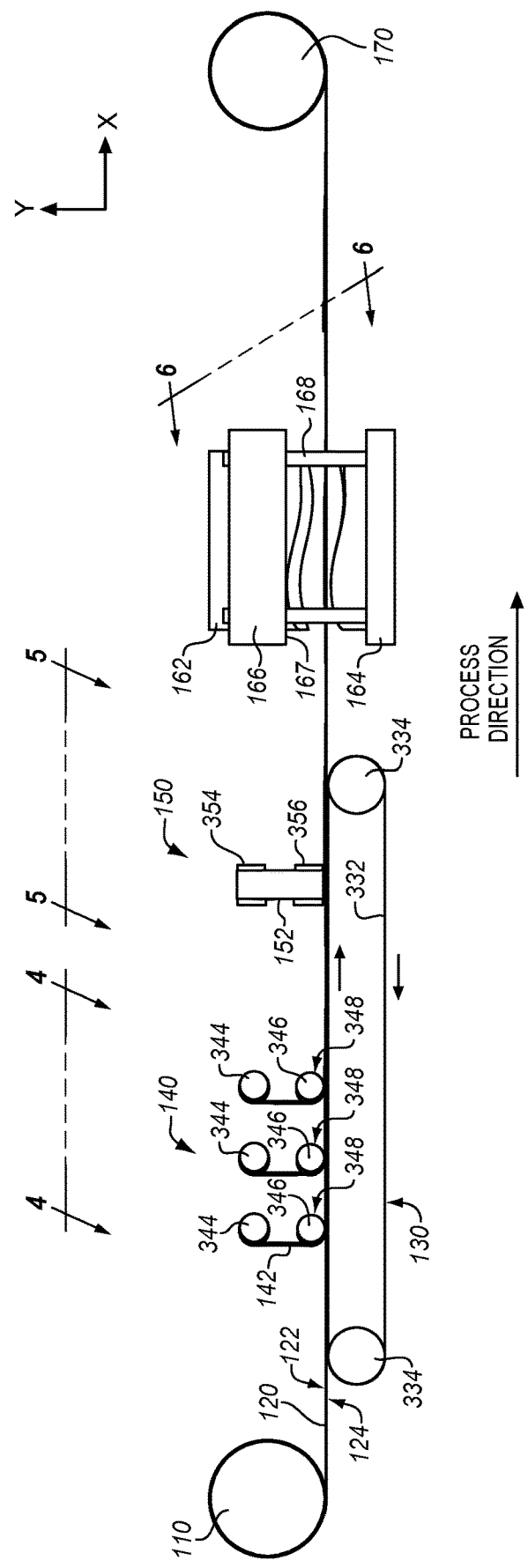
FIG. 3 is a side view of a preform fabrication system in an illustrative embodiment.
Figure 4:
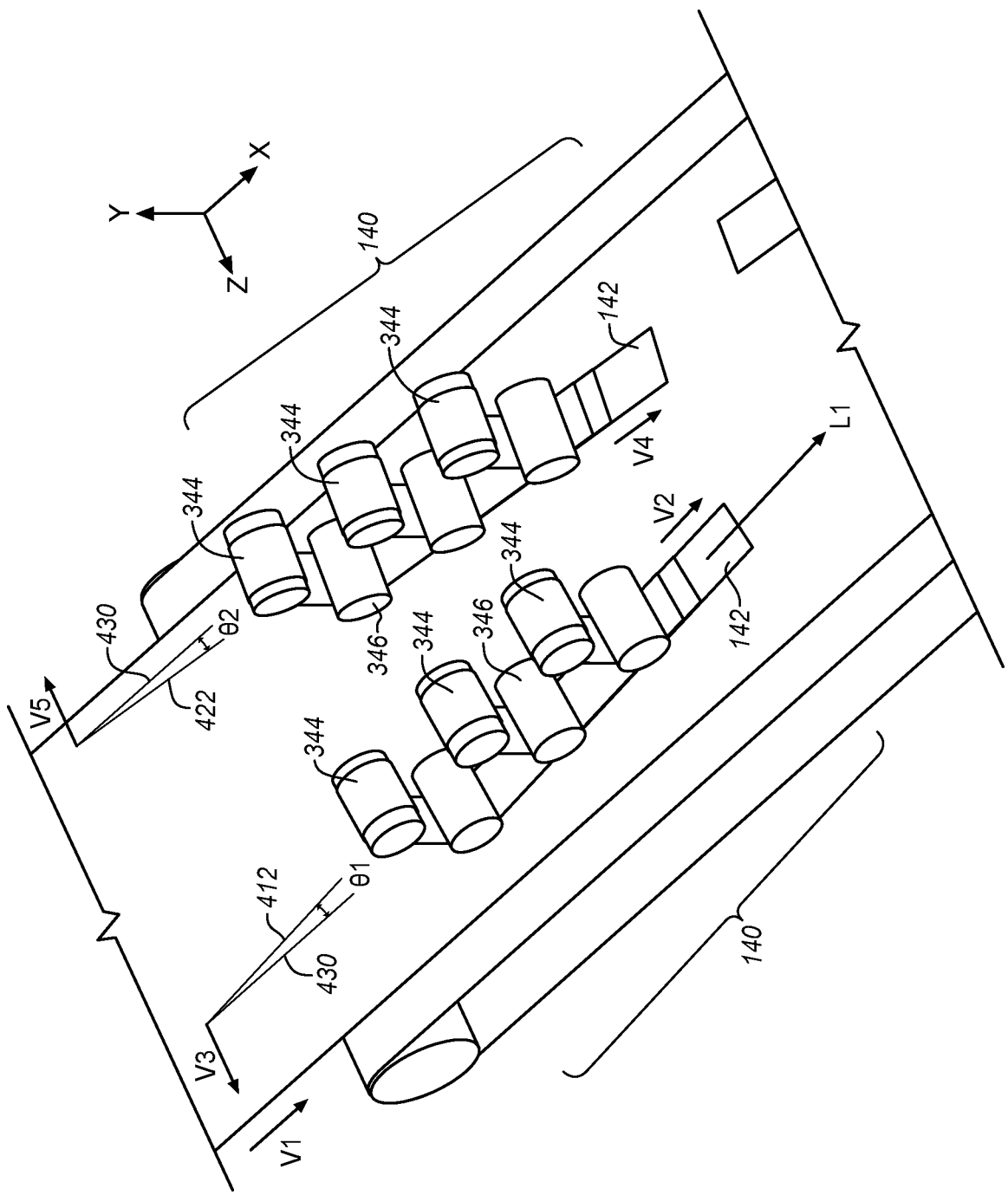
FIG. 4 is a perspective view of angled deposition stations in an illustrative embodiment.

In step 204, at least one tow of fiber reinforced composite material (e.g., dry fiber CFRP) is disposed atop web 120. Tows may be placed by angled deposition stations 140, perpendicular deposition station 150, etc. Disposing a tow may comprise operating a roller (e.g., a roller 346 of FIG. 3) to dispense a tow 142 at a compaction force while conveyor 130 provides a reactionary force to the compaction force at the location of dispensing. This operation dispenses the tow 142 onto the web 120 (as illustrated in FIGS. 3-4). The tows may be placed while web 120 is temporarily paused. In further embodiments, the tows may be dispensed while web 120 continues moving (i.e., being conveyed) in the process direction, by adjusting a position and/or orientation of the deposition stations in relation to web 120. In these further embodiments, the perpendicular deposition station 150 may move with web 120 in the process direction. Therefore, when viewed from the perspective of web 120, only the angled deposition stations 140 move at a different rate than web 120 in the process direction. For example, a deposition station may adjust a position of a roller, an angle of a roller, or a combination of both as web 120 proceeds in the process direction and the roller dispenses a tow onto the web 120. A roller may for example be moved at a rate of speed of web 120 in the process direction, in order to remain unmoving with respect to web 120 along the process direction while dispensing a tow onto the web 120.

In further embodiments, multiple layers of tows may be placed atop one another, and the tows may be adhered to web 120 via the application of heat (e.g., one hundred and fifty degrees Fahrenheit) and/or pressure (e.g., a few hundred kilopascals) from one or more rollers at the deposition stations.

In still further embodiments, a series of angled deposition stations 140 and perpendicular deposition stations 150 may be placed at the underside of web 120, in order to replace conveyor 130 and provide a reactionary force. Alternatively, deposition stations may be placed further along the process direction and may encounter reaction forces applied by a conveyor located at surface 122 of web 120. The application of heat and/or pressure by a deposition station may enhance an amount of tack found in a binder at a dry fiber tow, and firmly adheres the tow to web 120. In this manner, disposing the tow atop the web adheres the tow to the web. The tows dispensed in step 204 need not be dispensed parallel with the process direction, and the tows may even have lengthwise axes that are not parallel with the process direction. Furthermore, the tows may comprise a ply of unidirectional fibers having a fiber orientation (e.g., 0°, +45°, −45°, 90°, or any angle α) that is different than a fiber orientation of web 120.

Figure 6:
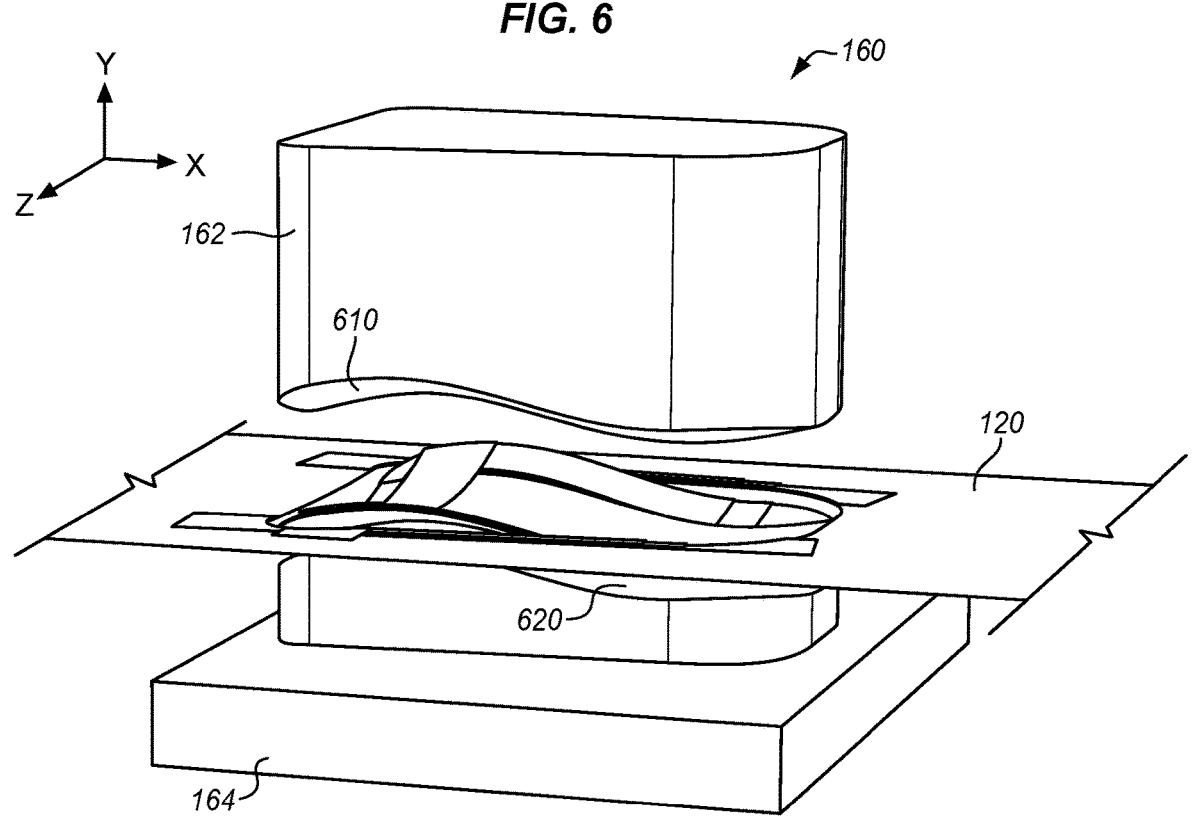
FIG. 6 is a perspective view of a stamp shaping a portion of a web in an illustrative embodiment.

The portion of the web 120 that has received the tows is now ready to be shaped into a preform for hardening into a composite part. Thus, dispensing spool 110 and take-up spool 170 proceed to convey the web 120 and the at least one tow in the process direction in step 206. Since the tow is adhered to the web 120, conveying the web 120 in the process direction causes the web 120 to convey the tow in the process direction to forming station 160. Forming station 160 is depicted in FIG. 6 to provide stamp forming.

In step 208, forming station 160 operates stamp 162 and mandrel 164 to shape the combination of tow and web into a desired shape. This induces slippage between plies within the stamped tow and web in step 210. Hence, during the stamp forming process, plies may experience slippage (i.e., shear) relative to other plies. The process of stamp forming also consolidates plies within the stamped tow and web in step 212 after forming and slippage occurs. In step 214, cutting tool 166 is operated to cut out a preform comprising the shaped combination of the tow and web. The web 120 may be temporarily halted at forming station 160 during this process, or the cutting and forming processes may be performed so quickly relative to the speed of conveyor 130 (e.g., within a fraction of a second) that no pause is required. The preform may then be moved to a curing tool, may be impregnated with resin, and may be hardened into a composite part.

Method 200 provides a substantial benefit over prior techniques because it eliminates the need for pre-cutting of plies, eliminates the need for ply storage, and eliminates the need for AFP machines. This in turn reduces cost and increases throughput when fabricating composite parts, which is highly desirable.

FIGS. 3-6 illustrate various features of preform fabrication system 100. Specifically, FIG. 3 is a side view of preform fabrication system 100 in an illustrative embodiment. FIG. 3 illustrates that each angled deposition station 140 includes one or more spools 344 that supply the tows 142 to rollers 346. Each roller 346 may be heated and/or may be driven (e.g., while moving in the process direction or relative to the process direction) in order to dispense a tow 142 at a desired rate of speed onto the web 120. That is, the roller 346 dispenses a tow 142 at a rate relative to a speed of the web 120, and applies the tow 142 relative to the web 120 while the web 120 is moving.

Furthermore, when dispensing tows, a roller 346 may press tow 142 against web 120 (and therefore press web 120 against belt 332 of conveyor 130) at a desired level of pressure, in order to tack a tow 142 to web 120. As shown in FIG. 4, perpendicular deposition station 150 includes a spool 354 that supplies a tow 152 to a roller 356. Spool 354 may operate in a similar manner to spools 344, and roller 356 may operate in a similar manner to rollers 346.

Conveyor 130 includes rollers 334 which convey the belt 332 at a rate of speed corresponding to the speed of web 120 in the process direction. In this manner, web 120 does not rub against conveyor 130 during travel, and belt 332 of conveyor 130 provides mechanical support/resistance that enables rollers 346 and roller 356 to apply a desired amount of downward pressure at compaction nip 348 against web 120, in order to secure tows to web 120.

FIG. 4 is a perspective view of angled deposition stations 140 in an illustrative embodiment. Specifically, FIG. 4 corresponds with view arrows 4 of FIG. 3. FIG. 4 illustrates relationships in motion and angle found between angled deposition stations 140 and web 120. For example, when web 120 proceeds at velocity V1 in the process direction, each roller 346 of one of angled deposition stations 140 may dispense tows 142 at a velocity V2. The direction 412 of V2 may deviate from the direction 430 of V1 by an angle θ1. In this manner, tows 142 may have a lengthwise axis (L1) that is not parallel with the lengthwise axis of web 120 (e.g., the process direction). The rollers 346 (or the entirety of the angled deposition station 140) may further be moved at a velocity V3. The magnitude and/or direction of V2 and/or V3 may be adjusted while rollers 346 are dispensing tows, for example in order to ensure that the tows maintain a constant angle with respect to web 120 and do not exhibit wrinkles.

In a similar fashion, another of angled deposition stations 140 may dispense tows 142 at a velocity V4, in a direction 422 that deviates from direction 420 of V1 by an angle θ2. The rollers 346 of the other angled deposition station may be moved at a velocity V5, and the magnitude and/or direction of V4 and/or V5 may be adjusted while rollers 346 are dispensing tows.

Figure 5:
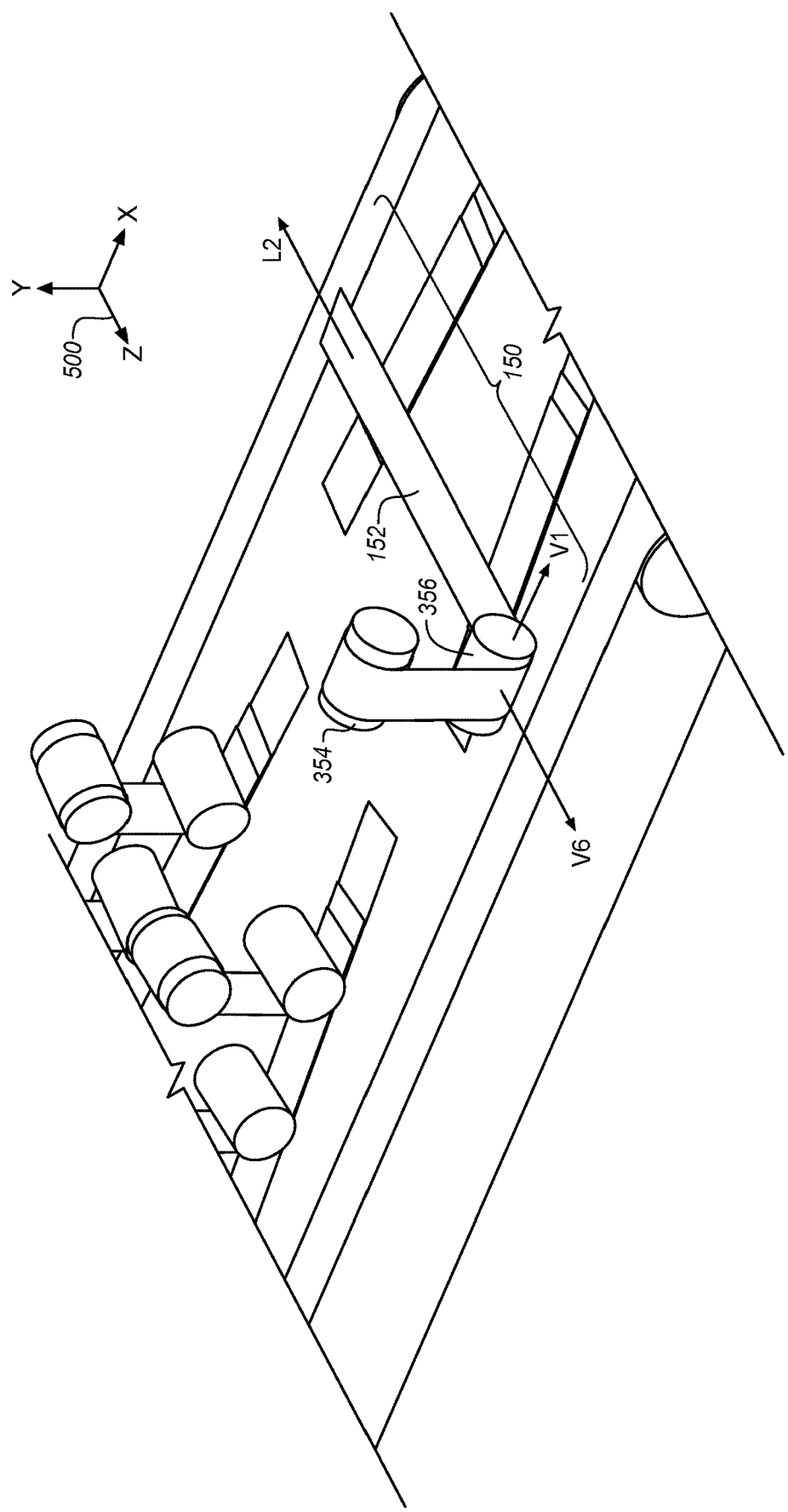
FIG. 5 is a perspective view of a perpendicular deposition station in an illustrative embodiment.

FIG. 5 is a perspective view of a perpendicular deposition station 150 in an illustrative embodiment. FIG. 5 corresponds with view arrows 5 of FIG. 3. According to FIG. 5, roller 356 (or the entirety of the perpendicular deposition station 150) is moved at velocity V1 in the web direction, such that the roller 356 does not move with respect to web 120 in the process direction when dispensing tow 152. However, roller 356 is moved at velocity V6 along the Z direction 500, which enables perpendicular deposition station 150 to apply tows having a lengthwise axis (L2) that are perpendicular to the lengthwise axis (e.g., the process direction) of web 120. Any of the deposition stations described herein may be moved back to a default position and/or orientation after completing layup for a preform or a portion of a preform. This enables the deposition stations to initiate layup of a next preform.

Figure 7:
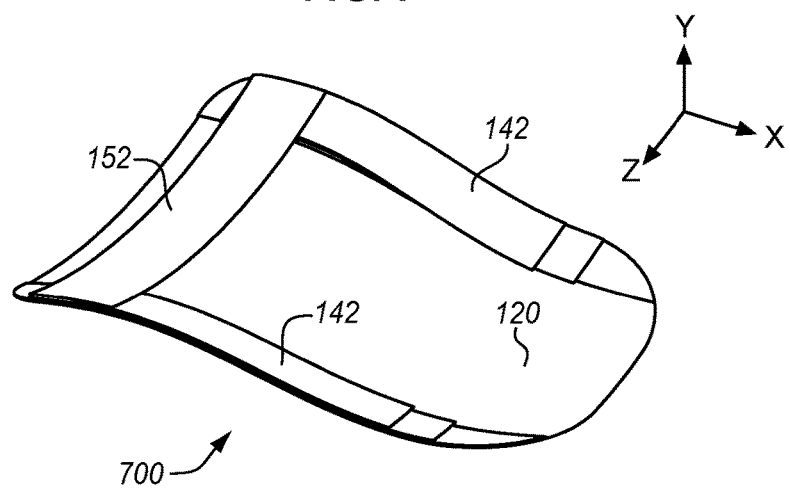
FIG. 7 is a perspective view of a preform that has been shaped and cut from a web of fiber reinforced composite material in an illustrative embodiment.

FIG. 6 is a perspective view of a stamp 162 shaping a portion of a web 120 in an illustrative embodiment, and corresponds with view arrows 6 of FIG. 3. Stamp 162 specifically shapes web 120, along with any tows that have been adhered to web 120. Stamp 162 may apply a predetermined amount of pressure to shape web 120 (e.g., hundreds of kilopascals of pressure). FIG. 6 further illustrates contour 610 at stamp 162, as well as contour 620 at mandrel 164. After stamp 162 has completed its operations, the portion of web 120 (and any adhered tows) will follow contour 610 and contour 620. FIG. 7 illustrates a completed preform 700 fabricated via preform fabrication system 100. The preform 700 has been shaped and cut, and includes tows 142 and a tow 152 at desired locations.

EXAMPLES

In the following examples, additional processes, systems, and methods are described in the context of system that utilizes a continuous web to fabricate preforms of composite material.

Figure 8:
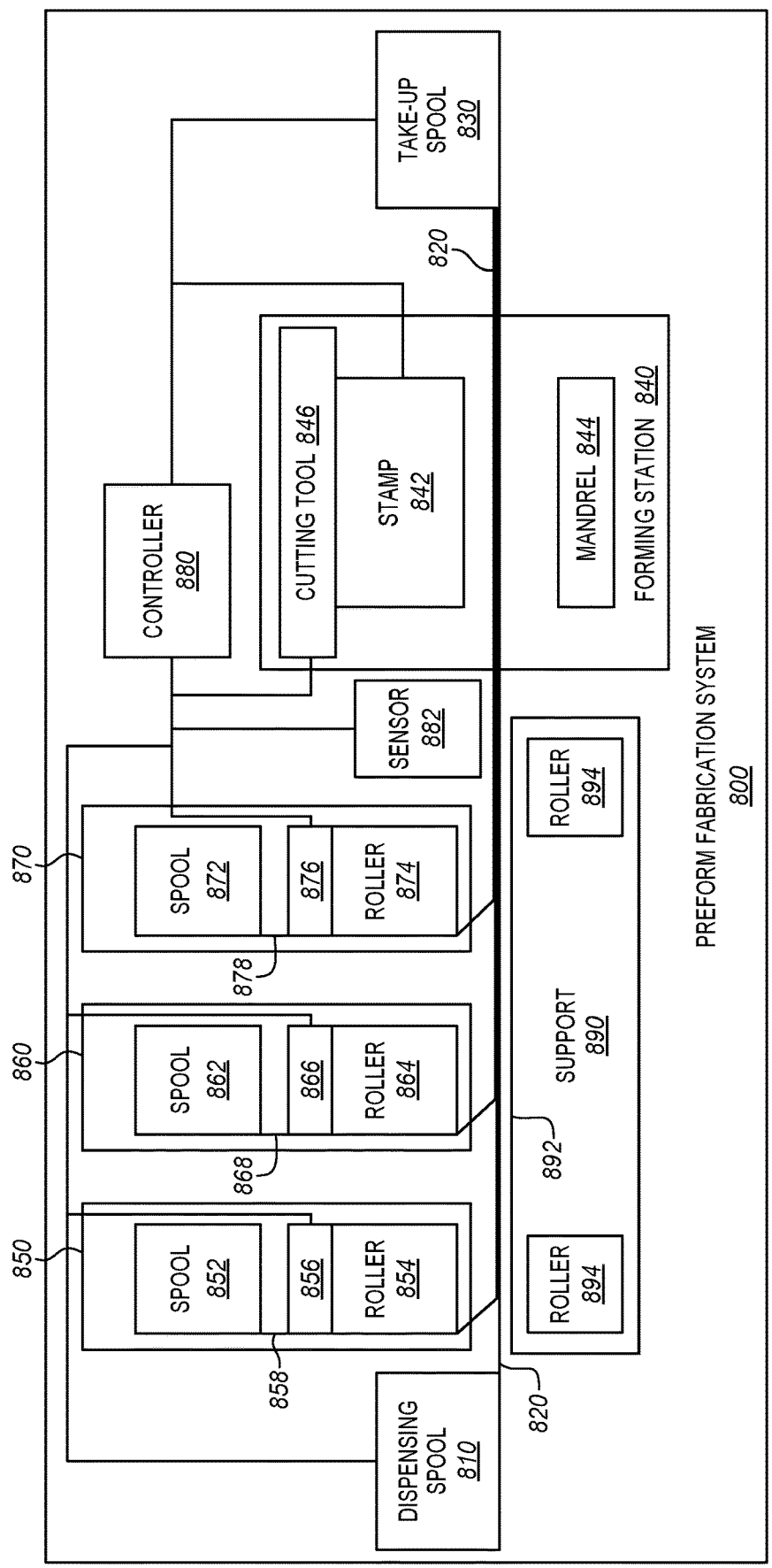
FIG. 8 is a block diagram of a preform fabrication system in an illustrative embodiment.

FIG. 8 is a block diagram of a preform fabrication system 800 in an illustrative embodiment. Preform fabrication system 800 includes dispensing spool 810, which provides web 820, and take-up spool 830, which receives portions of web 820 after they have been cut at forming station 840. At forming station 840, stamp 842 is driven into mandrel 844, and cutting tool 846 is driven downward to cut a preform from web 820. Deposition system 850 includes a spool 852 that provides a tow 858 of fiber reinforced material to a roller 854, which dispenses the tow 858 onto web 120. An actuator 856 may dynamically adjust a position and/or angle of roller 854 during this process. In a similar fashion deposition system 860 includes a spool 862, a tow 868, a roller 864, and an actuator 866, and deposition system 870 includes a spool 872, a tow 878, a roller 874-, and an actuator 876. In some embodiments, an unheated roller may be used, and heat may be applied by separate heaters (such as infrared heaters, not shown) prior to compaction In other embodiments, a heated roller may be used. Support 890 is a conveyor having a belt 892 and multiple rollers 894. Belt 892 supports web 820, and is conveyed in the process direction of web 820 in order to prevent rubbing or abrasion against web 820.

Controller 880 manages the operations of the various components discussed above. For example, controller 880 may implement instructions stored in a Numerical Control (NC) program in order to direct the timing, movements, and other operations of various coupled components. Controller 880 may for example receive feedback from one or more sensors 882 (e.g., infrared sensors, motion sensors, rotational sensors, etc.), and may use this input to control the timing and movements discussed above. Such feedback may indicate a location or angle of a tow relative to the web. Controller 880 may be implemented, for example, as custom circuitry, as a hardware processor executing programmed instructions, or some combination thereof.

Figure 9:
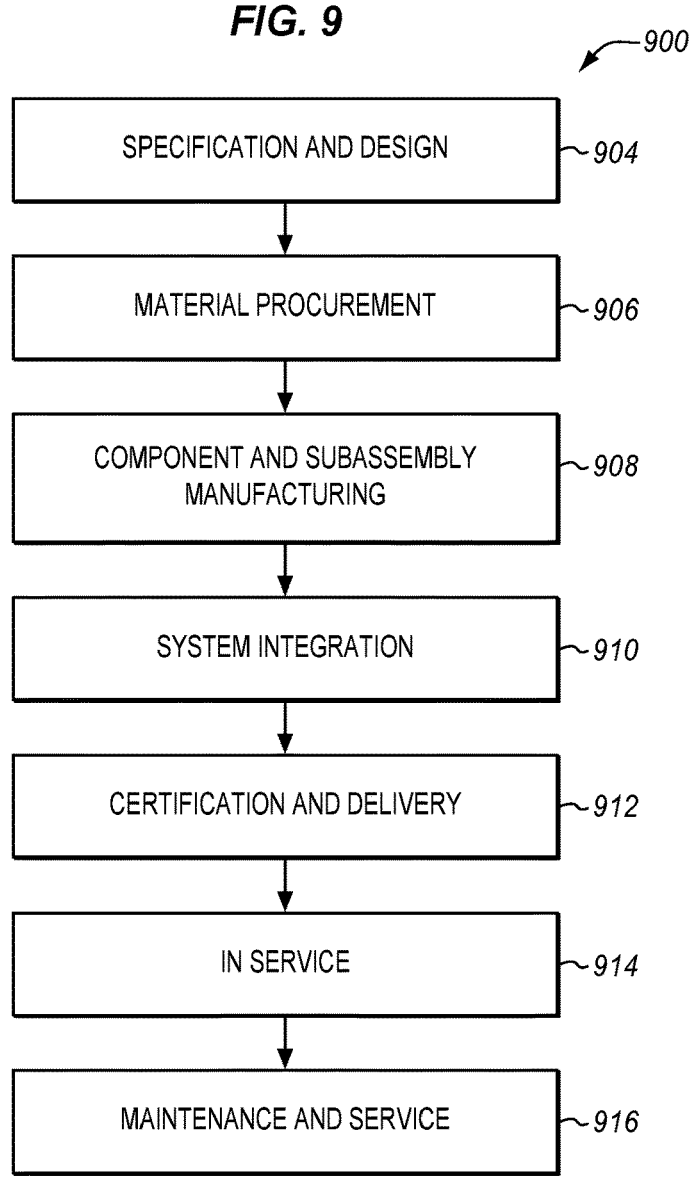
FIG. 9 is a flow diagram of aircraft production and service methodology in an illustrative embodiment.
Figure 10:
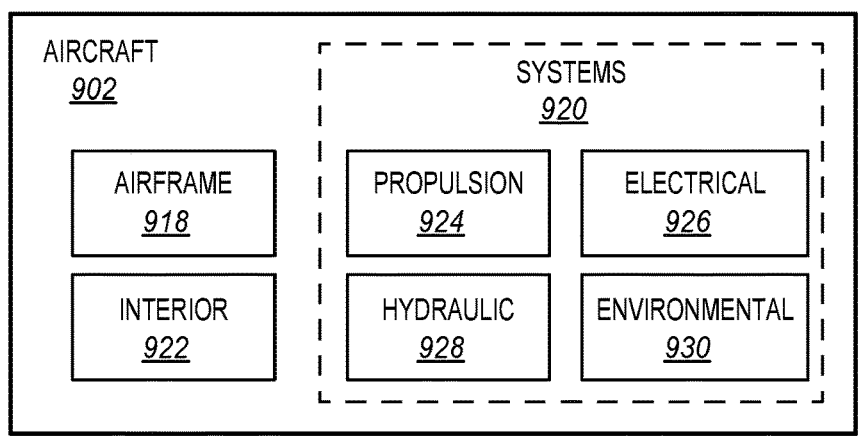
FIG. 10 is a block diagram of an aircraft in an illustrative embodiment.

Referring more particularly to the drawings, embodiments of the disclosure may be described in the context of aircraft manufacturing and service in method 900 as shown in FIG. 9 and an aircraft 902 as shown in FIG. 10. During preproduction, method 900 may include specification and design 904 of the aircraft 902 and material procurement 906. During production, component and subassembly manufacturing 908 and system integration 910 of the aircraft 902 takes place. Thereafter, the aircraft 902 may go through certification and delivery 912 in order to be placed in service 914. While in service by a customer, the aircraft 902 is scheduled for routine work in maintenance and service 916 (which may also include modification, reconfiguration, refurbishment, and so on). Apparatus and methods embodied herein may be employed during any one or more suitable stages of the production and service described in method 900 (e.g., specification and design 904, material procurement 906, component and subassembly manufacturing 908, system integration 910, certification and delivery 912, service 914, maintenance and service 916) and/or any suitable component of aircraft 902 (e.g., airframe 918, systems 920, interior 922, propulsion system 924, electrical system 926, hydraulic system 928, environmental 930).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 902 produced by method 900 may include an airframe 918 with a plurality of systems 920 and an interior 922. Examples of systems 920 include one or more of a propulsion system 924, an electrical system 926, a hydraulic system 928, and an environmental system 930. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 900. For example, components or subassemblies corresponding to component and subassembly manufacturing 908 may be fabricated or manufactured in a manner similar to components or subassemblies produced while the aircraft 902 is in service. Also, one or more apparatus embodiments, method embodiments, or a combination thereof may be utilized during the subassembly manufacturing 908 and system integration 910, for example, by substantially expediting assembly of or reducing the cost of an aircraft 902. Similarly, one or more of apparatus embodiments, method embodiments, or a combination thereof may be utilized while the aircraft 902 is in service, for example and without limitation during the maintenance and service 916. For example, the techniques and systems described herein may be used for material procurement 906, component and subassembly manufacturing 908, system integration 910, service 914, and/or maintenance and service 916, and/or may be used for airframe 918 and/or interior 922. These techniques and systems may even be utilized for systems 920, including, for example, propulsion system 924, electrical system 926, hydraulic 928, and/or environmental system 930.

In one embodiment, a part comprises a portion of airframe 918, and is manufactured during component and subassembly manufacturing 908. The part may then be assembled into an aircraft in system integration 910, and then be utilized in service 914 until wear renders the part unusable. Then, in maintenance and service 916, the part may be discarded and replaced with a newly manufactured part. Inventive components and methods may be utilized throughout component and subassembly manufacturing 908 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method of creating a contoured preform comprising:
    conveying a web of fiber reinforced composite material in a process direction;
    disposing a tow of fiber reinforced composite material atop a portion of the web;
    conveying the web and the tow in the process direction to a stamp;
    stamping the portion of the web and the tow into a contoured preform that is integral with the web, wherein the stamping is performed while the portion of the web and the tow are integral with the web; and
    cutting out the contoured preform from the web.

2. The method of claim 1 wherein:
    disposing the tow comprises operating a roller positioned above the web that dispenses the tow onto the web and compacts the tow against the web.

3. The method of claim 2 wherein:
    the roller dispenses the tow at an angle wherein a lengthwise axis of the tow is not parallel with the process direction of the web.

4. The method of claim 2 further comprising:
    adjusting at least one of a position or orientation of the roller relative to the web while the roller dispenses the tow onto the web.

5. The method of claim 4 wherein:
    adjusting the position of the roller comprises moving the roller at a rate of speed of the web.

6. The method of claim 4 wherein:
    the roller dispenses the tow at a rate relative to a speed of the web, and applies the tow relative to the web while the web is moving.

7. The method of claim 1 wherein:
    conveying the web in the process direction causes the web to convey the tow in the process direction.

8. The method of claim 1 wherein:
    the tow has a different fiber orientation than the web.

9. The method of claim 1 wherein:
    stamping causes ply slippage between the portion of the web and the tow, as well as consolidation of the portion of the web and the tow.

10. The method of claim 1 wherein:
    stamping is performed by driving a contoured stamp disposed at a first side of the web into a contoured mandrel disposed at a second side of the web.

11. A non-transitory computer readable medium embodying programmed instructions which, when executed by a processor, are operable for performing a method for creating a contoured preform, the method comprising:
    conveying a web of fiber reinforced composite material in a process direction;
    disposing a tow of fiber reinforced composite material atop a portion of the web;
    conveying the web and the tow in the process direction to a stamp;
    stamping the portion of the web and the tow into a contoured preform that is integral with the web, wherein the stamping is performed while the portion of the web and the tow are integral with the web; and
    cutting out the contoured preform from the web.

12. The medium of claim 11 wherein:
    disposing the tow comprises operating a roller positioned above the web that dispenses the tow onto the web and compacts the tow against the web.

13. The medium of claim 12 wherein:
    the roller dispenses the tow at an angle wherein a lengthwise axis of the tow is not parallel with the process direction of the web.

14. The medium of claim 12 further comprising:
    adjusting at least one of a position or orientation of the roller relative to the web while the roller dispenses the tow onto the web.

15. The medium of claim 14 wherein:
    adjusting the position of the roller comprises moving the roller at a rate of speed of the web.

16. The medium of claim 14 wherein:
    the roller dispenses the tow at a rate relative to a speed of the web, and applies the tow relative to the web while the web is moving.

17. The medium of claim 11 wherein:
    conveying the web in the process direction causes the web to convey the tow in the process direction.

18. The medium of claim 11 wherein:
    the tow has a different fiber orientation than the web.

19. The medium of claim 11 wherein:
    stamping causes ply slippage between the portion of the web and the tow, as well as consolidation of the portion of the web and the tow.

20. The medium of claim 11 wherein:
    stamping is performed by driving a contoured stamp disposed at a first side of the web into a contoured mandrel disposed at a second side of the web.

* * * * *